United States Patent
Dhoot et al.

(10) Patent No.: US 12,197,961 B2
(45) Date of Patent: Jan. 14, 2025

(54) UPGRADING OR DOWNGRADING HARDWARE BY SEAMLESSLY ADJUSTING USAGE OF COMPUTATIONAL RESOURCES ON COMPUTING DEVICE

(71) Applicant: International Business Machines Corporation, Armonk, NY (US)

(72) Inventors: Akash U. Dhoot, Pune (IN); Madhu Akhilesham, Pune (IN); Niteen D Lakhe, Pune (IN); Venkata Vara Prasad Karri; Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 17/588,303

(22) Filed: Jan. 30, 2022

(65) Prior Publication Data
US 2023/0244546 A1    Aug. 3, 2023

(51) Int. Cl.
G06F 9/50   (2006.01)
G06N 5/025  (2023.01)
G06N 20/00  (2019.01)

(52) U.S. Cl.
CPC ........... *G06F 9/5083* (2013.01); *G06N 5/025* (2013.01); *G06N 20/00* (2019.01)

(58) Field of Classification Search
CPC ........... G06F 9/5083; G06F 2209/5019; G06F 2209/5022; G06F 9/5016; G06F 9/5022;
(Continued)

(56) References Cited

U.S. PATENT DOCUMENTS

2012/0159367 A1   6/2012  Calcaterra et al.
2013/0138876 A1*  5/2013  Wang .............. G06F 12/0638
                                              711/E12.059
(Continued)

OTHER PUBLICATIONS

He et al., "Securing Over-The-Air IoT Firmware Updates Using Blockchain," Coins, May 5-7, 2019, Crete, Greece, May 5-7, 2019, pp. 1-8.
(Continued)

*Primary Examiner* — Tuan C Dao
(74) *Attorney, Agent, or Firm* — Shackelford, McKinley & Norton, LLP; Robert A. Voigt, Jr.

(57) ABSTRACT

A computer-implemented method, system and computer program product for seamlessly adjusting the utilization of computational resources of a computing device. A pattern of usage of computational resources of the computing device over a timeframe is determined. An artificial intelligence model uses such a pattern of usage and/or any identified contextual needs for upgrading or downgrading the computational resources of the computing device to determine the predicted amount of computational resources needed to be utilized by the computing device. Based on such a predicted amount, a blockchain transaction may be initiated and recorded to upgrade/downgrade the computational resources of the computing device. The rules on a smart contract, which defines a subscription for utilizing an allocated portion of the computational resources by the user, associated with the computing device are then updated based on the blockchain transaction which adjusts the amount of computational resources available to be utilized by the user.

20 Claims, 6 Drawing Sheets

(58) Field of Classification Search
CPC ...... G06F 9/5027; G06N 5/025; G06N 20/00; G06N 3/09; G06N 5/01; G06N 7/01; G06N 20/10; H04L 9/50
See application file for complete search history.

(56) References Cited

U.S. PATENT DOCUMENTS

| | | | | |
|---|---|---|---|---|
| 2013/0159273 | A1* | 6/2013 | Orr | G06Q 50/01 707/706 |
| 2014/0122861 | A1* | 5/2014 | El Maghraoui | G06F 12/0246 713/100 |
| 2014/0191724 | A1* | 7/2014 | Wojcik | H05K 5/0086 320/114 |
| 2014/0258446 | A1* | 9/2014 | Bursell | G06F 9/45558 709/217 |
| 2015/0100801 | A1* | 4/2015 | Maity | G06F 1/3231 713/320 |
| 2015/0229583 | A1* | 8/2015 | Ponsford | G06F 9/45533 709/226 |
| 2017/0242731 | A1 | 8/2017 | Xie et al. | |
| 2018/0113640 | A1* | 4/2018 | Fernandez | G06F 11/3419 |
| 2019/0004859 | A1* | 1/2019 | Bowers | H04W 64/00 |
| 2019/0108576 | A1* | 4/2019 | LaPrade | G06Q 20/389 |
| 2019/0244287 | A1* | 8/2019 | Prasad Datta | G06Q 40/03 |
| 2019/0268277 | A1* | 8/2019 | Asthana | H04L 67/10 |
| 2020/0057558 | A1* | 2/2020 | Beloussov | G06F 3/0634 |
| 2020/0301740 | A1* | 9/2020 | Gabrielson | G06N 3/08 |
| 2021/0064431 | A1* | 3/2021 | Smith | G06F 9/5077 |
| 2021/0243696 | A1* | 8/2021 | Sanaullah | H04W 52/0258 |

OTHER PUBLICATIONS

Youssef Fenjiro, "Machine Learning and IT Infrastructure Management Automation (AIOps)," https://medium.com/@fenjiro/machine-learning-and-it-infrastructure-management-automation-4c4c06e213b9, Dec. 11, 2018, pp. 1-4.

Pace et al., "A Data-Driven Approach to Dynamically Adjust Resource Allocation for Compute Clusters," arXiv:1807.00368v1, Jul. 1, 2018, pp. 1-15.

\* cited by examiner

UPGRADING OR DOWNGRADING HARDWARE BY SEAMLESSLY ADJUSTING USAGE OF COMPUTATIONAL RESOURCES ON COMPUTING DEVICE

TECHNICAL FIELD

The present disclosure relates generally to hardware upgrades and downgrades in computing devices, and more particularly to upgrading or downgrading hardware by seamlessly adjusting usage of computational resources on the computing device.

BACKGROUND

Hardware upgrades and downgrades in computing devices typically involve the installation or removal of hardware. For example, a hardware upgrade may involve the installation of a hardware enhancement to a standard hardware feature or the installation of optional hardware features. A hardware downgrade, on the other hand, is the opposite of a hardware upgrade. For example, a hardware downgrade may involve the removal of a hardware enhancement or optional hardware features currently being utilized by the user of the computing device.

SUMMARY

In one embodiment of the present disclosure, a computer-implemented method for seamlessly adjusting utilization of computational resources of a computing device comprises determining a pattern of usage of the computational resources of the computing device over a timeframe, where the computing device is preloaded with the computational resources, where the computational resources correspond to hardware computing resources, and where a portion of the computational resources is available to be utilized by a user of the computing device based on a subscription as defined in a smart contract. The method further comprises determining, by an artificial intelligence model, a predicted amount of computational resources needed to be utilized by the computing device using the determined pattern of usage of the computational resources of the computing device over the timeframe. The method additionally comprises initiating and recording a blockchain transaction to upgrade or downgrade the computational resources of the computing device based on the predicted amount of computational resources needed to be utilized by the computing device. Furthermore, the method comprises updating rules of the smart contract based on the blockchain transaction thereby adjusting an amount of the computational resources of the computing device available to be utilized by the user of the computing device.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
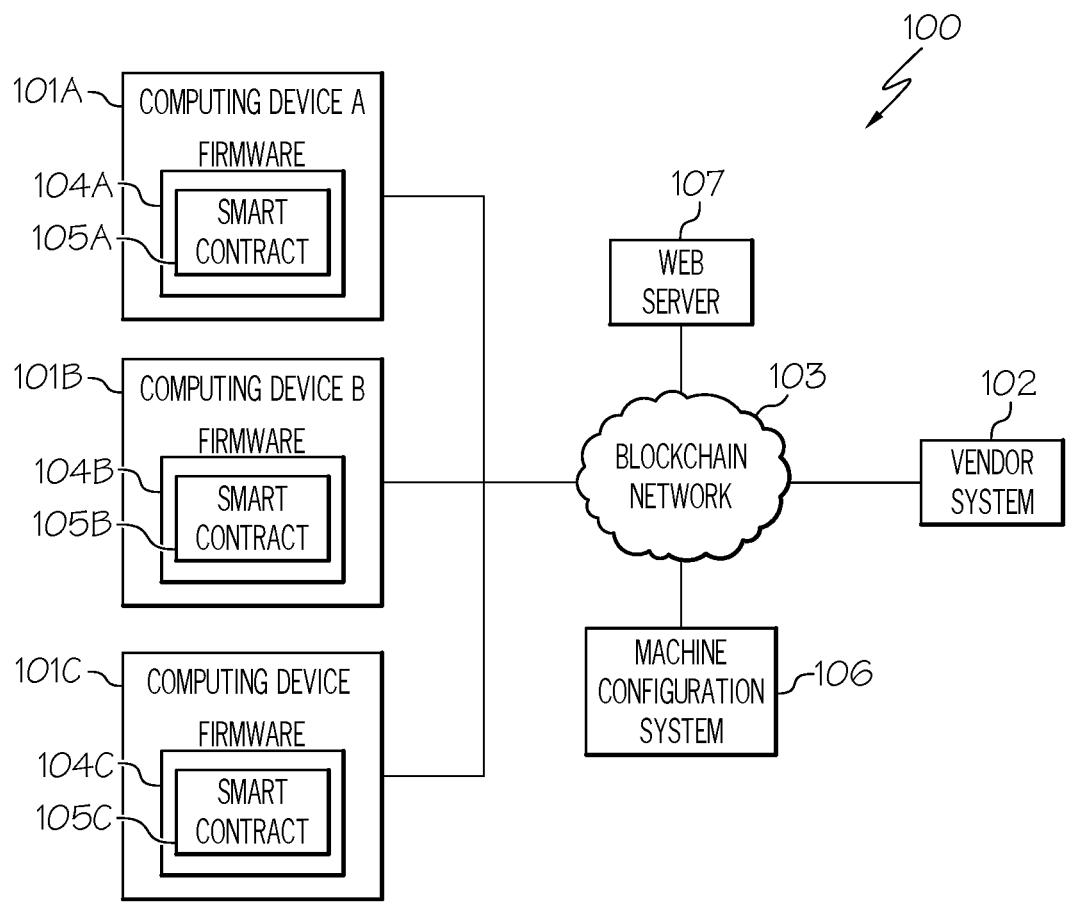
FIG. 1 illustrates a communication system for practicing the principles of the present disclosure in accordance with an embodiment of the present disclosure.

As stated in the Background section, hardware upgrades and downgrades in computing devices typically involve the installation or removal of hardware. For example, a hardware upgrade may involve the installation of a hardware enhancement to a standard hardware feature or the installation of optional hardware features. A hardware downgrade, on the other hand, is the opposite of a hardware upgrade. For example, a hardware downgrade may involve the removal of a hardware enhancement or optional hardware features currently being utilized by the user of the computing device.

Such hardware upgrades or downgrades involve the installation or removal of computational resources, such as the hard disk drive, processor (e.g., central processing unit), blade, computer memory (random access memory), etc.

Currently though in order to upgrade or downgrade hardware on a computing device, an individual needs to physically modify the amount of computational resources currently installed on the computing device, such as by increasing or decreasing the amount of computational resources on the computing devices. Furthermore, prior to such a modification, especially in an enterprise setting, an approval for a hardware upgrade or downgrade would need to be obtained. For a hardware upgrade, a procurement request may need to be made to obtain the additional computational resources to be installed in the computing device followed by having the requested computational resources be delivered at a specific location. The computational resources would then be physically installed on the computing device as discussed above. For a hardware downgrade, after the request for downgrading the computational resources has been approved, a portion of the computational resources on the computing device would then be physically removed as discussed above.

Such a process is inefficient, costly and time consuming. In the era of agile philosophy, such a process becomes a constraint for achieving real agility.

The embodiments of the present disclosure provide a means for achieving real agility for hardware upgrades or downgrades by seamlessly adjusting the usage of the computational resources on the computing device as discussed further below.

In some embodiments of the present disclosure, the present disclosure comprises a computer-implemented method, system and computer program product for seamlessly adjusting the utilization of the computational resources of a computing device. In one embodiment of the present disclosure, a pattern of usage of the computational resources of the computing device over a timeframe is determined. Such a computing device may be preloaded with the computational resources, where such computational resources correspond to hardware computing resources (e.g., hard disk drive, processor core, blade, computer memory, etc.). Furthermore, only a portion of the computational resources may be available to be utilized by the user of the computing device based on a subscription as defined in a smart contract, which may be stored in the firmware of the computing device. After determining the pattern of usage of the computational resources of the computing device over the timeframe, such a pattern of usage may be used by an artificial intelligence model to determine a predicted amount of computational resources needed to be utilized by the computing device. Furthermore, in one embodiment, the artificial intelligence model may alternatively, or in addition, utilize any identified contextual needs for upgrading or downgrading the computational resources of the computing device to determine the predicted amount of computational resources needed to be utilized by the computing device. "Contextual need" for a hardware upgrade/downgrade, as used herein, refers to the circumstances, such as leaned from social media data, that would indicate a change (e.g., hardware upgrade/downgrade) in the amount of computational resources that should be available to be used by the user of the computing device. "Upgrading," as used herein, refers to a hardware upgrade which may involve the access of additional hardware resources, such as computational resources (e.g., increasing the storage space available to be used on the hard disk drive by the user). "Downgrading," as used herein, refers to the opposite of upgrading, namely, a hardware downgrade which may involve the denial of access of hardware resources, such as computational resources (e.g., decreasing the storage space available to be used on the hard disk drive by the user). Based on the predicted amount of computational resources needed to be utilized by the computing device, a blockchain transaction is initiated and recorded to upgrade or downgrade the computational resources of the computing device in response to the difference between the predicted amount of computational resources needed to be utilized by the computing device and the current usage of the computational resources of the computing device exceeding a threshold value and in response to receiving approval for such a hardware upgrade/downgrade by the vendor and the user. Such a new blockchain transaction results in adding a new block to the distributed ledger of the blockchain network. The rules on the smart contract are then updated based on the new block added to the distributed ledger of the blockchain network. Upon updating the rules of the smart contract, the amount of computational resources available to be utilized by the user of the computing device is automatically adjusted based on the blockchain transaction. In this manner, usage of the computational resources on the computing device is seamlessly adjusted without requiring physically installation or removal of hardware by a technician.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a vendor system 102 via a blockchain network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to blockchain network 103 and consequently communicating with other computing devices 101 and vendor system 102. It is noted that both computing devices 101 and the users of computing devices 101 may be identified with element number 101.

In one embodiment, such computing devices 101 are preloaded with hardware, where the usage of such hardware is based on a subscription as defined in a smart contract as discussed below. Such hardware includes "computational resources," including, but not limited to, the hard disk drive, processor cores, blades, computer memory (random access memory), etc. In one embodiment, computational resources that are not available to be utilized by the user of computing device 101 based on the rules defined in the smart contract may be crowd sourced to a shared pool of computational resources or a cloud computational environment that can be used by a collective group of computing devices 101 seamlessly.

Furthermore, as shown in FIG. 1, system 100 includes a vendor system 102 corresponding to a computing system utilized by a blockchain vendor. A "blockchain vendor," as used herein, refers to an enterprise that provides services, such as approval or denial of upgrading or downgrading the computational resources in computing device 101 as discussed further below. Such approval or denial may be based on the rules for the usage of the computational resources as recited in the smart contract as discussed further below.

Blockchain network 103, as used herein, refers to a network that manages blockchains. In one embodiment, such a network may correspond to a peer-to-peer network. A "blockchain," as used herein, refers to a growing list of records, called "blocks," that are linked together using cryptography. Each block contains a cryptographic hash of the previous block, a timestamp, and transaction data. The timestamp provides that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactivity without altering all subsequent blocks.

As discussed above, blockchains are managed by network 103, such as a peer-to-peer network. Such blockchains are managed by network 103 for use as a publicly distributed ledger, where nodes collectively adhere to a protocol to communicate and validate new blocks.

In one embodiment, blockchain network 103 includes one of the following types of blockchain networks: public blockchain network, private blockchain network, consortium blockchain network and permissioned blockchain network.

A public blockchain network is non-restrictive and permissionless, and anyone with Internet access can sign-on to a blockchain platform to become an authorized node. In a public blockchain network, information is distributed across the network, such as a peer-to-peer network. Its decentralized nature requires a method for verifying the authenticity of data.

Such a method may be a consensus algorithm whereby participants in the blockchain reach agreement on the current state of the ledger. In one embodiment, such consensus methods include proof of word and proof of stake. Furthermore, in such a public blockchain network, users can access current and past records. No valid record or transaction can be changed on the network and any one can verify the transactions.

A private blockchain network, similar to a public blockchain network, is a decentralized peer-to-peer network. However, one organization governs the network, controlling who is allowed to participate, execute a consensus protocol and maintain the shared ledger. In one embodiment, the private blockchain can be run behind a corporate firewall and be hosted on the premises.

A consortium blockchain network involves multiple organizations that share the responsibilities of maintaining a blockchain. These pre-selected organizations determine who may submit transactions or access the data. A consortium blockchain is ideal for business when all participants need to be permissioned and have a shared responsibility for the blockchain.

A permissioned blockchain network refers to placing restrictions on who is allowed to participate in the network and in what transactions. Participants need to obtain an invitation or permission to join.

Such blockchain networks provide ledger and smart contract (chaincode) services to applications. In particular, smart contracts are used to generate transactions which are subsequently distributed to every peer node in the blockchain network where they are immutably recorded on their copy of the ledgers. Such users of applications may be end users using client applications or blockchain network administrators.

In communication system 100, computing devices 101A-101C include firmware 104A-104C, respectively, that stores a smart contract 105A-105C, respectively. Firmware 104A-104C may collectively or individually be referred to as firmware 104. Furthermore, smart contracts 105A-105C may collectively or individually be referred to as smart contracts 105 or smart contract 105, respectively.

Firmware 104, as used herein, refers to a specific class of computer software that is embedded in hardware. As a result, it operates without going through application programming interfaces, the operating system or device drivers.

In one embodiment, firmware 104 stores a smart contract 105 as shown in FIG. 1. "Smart contract 105," as used herein, refers to a program stored on a blockchain that stores the rules for accessing the computational resources on computing device 101. Such rules relate to the user's (user of computing device 101) subscription of using the computational resources on computing device 101, such as the hard disk drive, processor core, blade, computer memory (random access memory), etc. A "subscription," as used herein, refers to an agreement between the vendor of vendor system 102 and the user of computing device 101 to utilize a certain amount of the computational resources installed on computing device 101. Such a subscription can be updated based on upgrading or downgrading the computational resources to be available to be utilized by the user as discussed further below. In one embodiment, such a subscription may be modified or terminated by the user whereby the user can unsubscribe to the usage of the computational resources on computing device 101. In one embodiment, such a subscription is enforced based on the rules of the smart contract, which may be updated when the subscription between the vendor and the user of computing device 101 is modified.

For example, the user (user of computing device 101) may have purchased a subscription to utilize a portion of the preloaded computational resources on computing device 101 with the vendor of vendor system 102. The rules of such a subscription, such as the maximum amount of computational resources that may be utilized according to the subscription, may be stored in the smart contract 105 embedded in firmware 104 of computing device 101.

System 100 further includes a machine configuration system 106 connected to blockchain network 103. Machine configuration system 106 is configured to seamlessly adjust the computational resources available to be utilized by the user of computing device 101. In one embodiment, machine configuration system 106 recommends upgrading or downgrading the computational resources available to be utilized by the user of computing device 101 based on the predicted amount of computational resources needed to be utilized by computing device 101, where such a prediction may be based on the pattern of usage of the computational resources of computing device 101 over a timeframe and/or the user's contextual need for a hardware upgrade/downgrade of the computational resources based on monitored social media data as discussed further below. "Upgrading," as used herein, refers to a hardware upgrade which may involve the access of additional hardware resources, such as computational resources (e.g., increasing storage space available to be used on the hard disk drive by the user, increasing memory space available to be used on the computer memory by the user, increasing the number of cores in a multicore processor available to be used by the user, increasing the number of server modules ("blades") in a chassis to be utilized by the user, etc.). "Downgrading," as used herein, refers to the opposite of upgrading, namely, a hardware downgrade which may involve the denial of access of hardware resources, such as computational resources (e.g., decreasing storage space available to be used on the hard disk drive by the user, decreasing memory space available to be used on the computer memory by the user, decreasing the number of cores in a multicore processor available to be used by the user, decreasing the number of server modules ("blades") in a chassis to be utilized by the user, etc.).

In one embodiment, machine configuration system 106 makes such a recommendation using an artificial intelligence model that is trained to predict the amount of computational resources needed to be utilized by computing device 101 using training data consisting of patterns of usage behavior of the computational resources and/or contextual needs for a hardware upgrade/downgrade using social media data. "Contextual need" for a hardware upgrade/downgrade, as used herein, refers to the circumstances, such as leaned from social media data, that would indicate a change (e.g., hardware upgrade/downgrade) in the amount of computational resources that should be available to be used by the user of computing device 101. For example, if the user of computing device 101 was going to be on vacation at a remote location with very limited Internet bandwidth, then there may be a contextual need for an increase in the storage space of the hard disk drive of computing device 101 to store movies, videos, etc. for the children to be entertained. Such information may be obtained based on monitoring social media data hosted by a web server 107 connected to blockchain network 103 as shown in FIG. 1.

In one embodiment, web server 107 is configured to offer a social networking and/or microblogging service thereby enabling users of computing devices 101 to send and read other users' posts. "Posts," as used herein, include any one or more of the following: text (e.g., comments, sub-comments and replies), audio, video images, etc. Such posts form part of the social media data that may be monitored and examined by machine configuration system 106. Furthermore, web server 107, as used herein, is configured to enable various collaborative activities, such as online discussion sites (e.g., public forums).

In one embodiment, web server 107 is configured to host websites (website is a collection of relevant webpages that is addressed to a Uniform Resource Locator (URL)) and serve contents (e.g., social media data) to the World Wide Web, which are accessible to be monitored and analyzed by machine configuration system 106.

Referring again to machine configuration system 106 of FIG. 1, in addition to monitoring and analyzing social media data, machine configuration system 106 may also be configured to monitor and track usage of the computational resources of computing devices 101 thereby determining the pattern of usage of the computational resources of computing devices 101. As previously discussed, such information (along with possibly any identified contextual needs for a hardware upgrade/downgrade) may be utilized by an artificial intelligence model to predict the amount of computational resources needed to be utilized by a computing device 101. If the difference between the predicted amount of computational resources needed to be utilized by computing device 101 and the current usage of the computational resources of computing device 101 exceeds a threshold value, then an option may be presented to the user of computing device 101 to upgrade or downgrade the computational resources, providing that such hardware upgrade/downgrade is approved by the vendor. A further description of these and other features is provided further below.

A description of the software components of machine configuration system 106 used for seamlessly adjusting the usage of the computational resources on computing device 101 is provided below in connection with FIG. 2. A description of the hardware configuration of machine configuration system 106 is provided further below in connection with FIG. 3.

System 100 is not to be limited in scope to any one particular network architecture. System 100 may include any number of computing devices 101, vendor systems 102, blockchain networks 103, machine configuration systems 106 and web servers 107.

Figure 2:
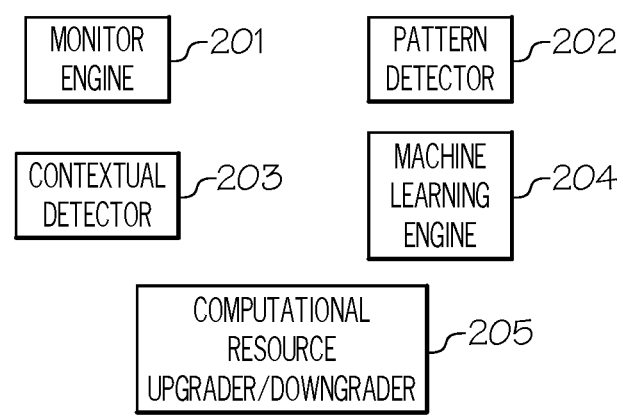
FIG. 2 is a diagram of the software components of the machine configuration system used for seamlessly adjusting the usage of the computational resources on the computing device in accordance with an embodiment of the present disclosure.

As stated above, FIG. 2 is a diagram of the software components of machine configuration system 106 used for seamlessly adjusting the usage of the computational resources on computing device 101 in accordance with an embodiment of the present disclosure.

Referring to FIG. 2, in conjunction with FIG. 1, machine configuration system 106 includes a monitor engine 201 configured to monitor and track the usage of the computational resources of computing devices 101 over a timeframe, which may be user-selected. In one embodiment, such monitoring and tracking includes monitoring and tracking the current usage of the computational resources of computing devices 101. As previously discussed, computing device 101 is preloaded with hardware, where the usage of such hardware is based on a subscription as defined in a smart contract. Such hardware includes "computational resources," including, but not limited to, the hard disk drive, processor cores, blades, computer memory (random access memory), etc.

Examples of software tools utilized by monitor engine 201 to monitor and track the usage of the computational resources of computing devices 101 over a timeframe, include, but not limited to, SolarWinds® Server and Application Monitor, SolarWinds® Storage Resource Monitor, Paessler® PRTG®, SolarWinds® Monitor Tool, PRTG® Network Monitor, ManageEngine® OpManager, SolarWinds® Memory Monitor Tool, WhatsUp® Gold, etc.

Machine configuration system 106 further includes a pattern detector 202 configured to determine a pattern of usage of the computational resources of computing device 101 based on the monitoring and tracking of the usage of the computational resources of computing device 101 over a timeframe by monitor engine 201. A "pattern of usage" of the computational resources, as used herein, refers to the variance in usage of the computational resources (e.g., core of a multicore processor, computer memory) over a timeframe (e.g., last 60 minutes).

Examples of software tools utilized by pattern detector 202 to determine the pattern of usage of the computational resources of computing devices 101 based on the monitored and tracked usage of such computational resources, include, but not limited to, SolarWinds® Server and Application Monitor, SolarWinds® Storage Resource Monitor, Paessler® PRTG®, SolarWinds® Monitor Tool, PRTG® Network Monitor, ManageEngine® OpManager, SolarWinds® Memory Monitor Tool, WhatsUp® Gold, etc.

Monitor engine 201 is further configured to monitor social media data pertaining to the users of computing devices 101. For example, monitor engine 201 may search and examine social media data posted by the users of computing devices 101 on the Internet. Such postings may involve publicly available postings made by the users of computing devices 101 on social media platforms (e.g., Twitter®, Facebook®) hosted by web server 107. For example, such postings may be made by the users of computing devices 101 on the users' publicly accessible social media profile page.

In one embodiment, the particular user's social media accounts are identified based on the username of the user of computing device 101, which may be provided to machine configuration system 106 by the user upon initiation of the utilization of the computational resources on computing device 101 via smart contract 105. Such information may be inputted to machine configuration system 106 via various input means of computing device 101, such as keyboard, mouse, etc. Upon receipt of the username, the user's username may be utilized by an application (e.g., WhatsMy-Name, NameCheck, Sherlock) to identify social media accounts associated with the user's username. In an alternative embodiment, the user of computing device 101 provides a listing of the social media accounts to machine configuration system 106 upon initiation of the utilization of the computational resources on computing device 101 via smart contract 105, such as via various input means of computing device 101, such as keyboard, mouse, etc.

Examples of software tools utilized by monitor engine 201 to monitor social media data, such as social media posts, include, but not limited to, Keyhole, Hootsuite®, Twitter® Counter, Digimind®, TweetReach, Sprout Social®, Klout®, Buzzlogix®, Zoho® Social, Agorapulse®, Brand24®, Mention®, Trackur, etc.

Machine configuration system 106 further includes a contextual detector 203 configured to determine if there is a contextual need for a hardware upgrade/downgrade based on identifying keywords in the monitored social media data that are stored in a data structure (e.g., table). As discussed above, a contextual need for a hardware upgrade/downgrade refers to the circumstances, such as leaned from social media data, that would indicate a change (e.g., hardware upgrade/downgrade) in the amount of computational resources that should be available to be used by the users of computing devices 101. Such circumstances may be identified based on keywords stored in the data structure discussed above. For example, keywords, such as "vacation" or "travel" along with the term "remote" may be associated with a contextual need for a hardware upgrade, such as an increase in the storage space of the hard disk drive of computing device 101 to store movies, videos, etc. for the children to be entertained. In one embodiment, contextual detector 203 performs a look-up in such a data structure using natural language processing for terms that match the text in the examined social media posts, and therefore, identify a contextual need for a hardware upgrade/downgrade as identified in the data structure. By matching such terms, contextual detector 203 is able to identify a contextual need for a hardware upgrade/downgrade in the data structure. In one embodiment, such keywords and associated contextual needs for a hardware upgrade/downgrade (e.g., increase in the storage space of the hard disk drive based on terms, such as "vacation" and "remote") are populated in the data structure discussed above by an expert. In one embodiment, such a data structure is stored in a storage device (e.g., memory, disk unit) of machine configuration system 106.

Furthermore, contextual detector 203 determines the duration of time for such a change (e.g., hardware upgrade/downgrade) based on the terms used in the examined social media posts. For instance, the user of computing device 101 may indicate returning from vacation within one week from the day the user leaves for vacation in a social media post. As a result, the contextual need for a hardware upgrade may only be for a week while the user is on vacation. In one embodiment, such circumstances may be identified based on keywords stored in the data structure discussed above. For example, keywords, such as "returning home" or "ending vacation" may be associated with a contextual need for a hardware downgrade, such as a decrease in the storage space of the hard disk drive of computing device 101 or a return to a prior amount of storage space of the hard disk drive of computing device 101 on the date that the user returns home from vacation since the original need for having an additional amount of storage space (e.g., to store movies, videos, etc. for the children to be entertained) is no longer applicable. As discussed above, in one embodiment, contextual detector 203 performs a look-up in such a data structure using natural language processing for terms that match the text in the examined social media posts, and therefore, identify a contextual need for a hardware upgrade/downgrade as identified in the data structure. By matching such terms, contextual detector 203 is able to identify a contextual need for a hardware upgrade/downgrade in the data structure. In one embodiment, such keywords and associated contextual needs for a hardware upgrade/downgrade (e.g., return to a prior amount of storage space in the hard disk drive based on terms, such as "returning home") are populated in the data structure discussed above by an expert. In one embodiment, such a data structure is stored in a storage device (e.g., memory, disk unit) of machine configuration system 106.

Machine configuration system 106 further includes a machine learning engine 204 configured to use a machine learning algorithm (e.g., supervised learning) to build an artificial intelligence model based on sample data consisting of patterns of usage of computational resources obtained from pattern detector 202 for various users of computing devices 101 and/or contextual needs for a hardware upgrade/downgrade for various users of computing devices 101 obtained from contextual detector 203 (e.g., increase in the storage space of the hard disk drive based on terms, such as "vacation" and "remote").

Such a data set is referred to herein as the "training data," which is used by the machine learning algorithm to make predictions or decisions as to the appropriate amount of computational resources needed to be utilized by computing device 101, including in the near-term. The algorithm iteratively makes predictions on the training data as to the appropriate amount of computational resources needed to be utilized by computing device 101 until the predictions achieve the desired accuracy. Such a desired accuracy is determined based on the computational resources predicted to be needed by an expert based on the usage patterns of computational resources over a timeframe and/or the contextual needs for a hardware upgrade/downgrade. Examples of such supervised learning algorithms include nearest neighbor, Naïve Bayes, decision trees, linear regression, support vector machines and neural networks.

In one embodiment, the artificial intelligence model (machine learning model) corresponds to a classification model trained to predict the appropriate amount of computational resources needed to be utilized by computing device 101.

Upon training the artificial intelligence model to predict the amount of computational resources needed to be utilized by computing device 101 based on usage patterns of computational resources over a timeframe and/or contextual needs for a hardware upgrade/downgrade, computational resource upgrader/downgrader 205 of machine configuration system 106 determines whether the predicted amount of computational resources needed to be utilized by computing device 101 (e.g., 16 GB of the hard disk drive) exceeds or falls behind the current usage of computational resources (e.g., 8 GB of the hard disk drive), as provided by monitor engine 201, by a threshold value (e.g., 4 GB for hard disk drive), which may be user-selected. It is noted for clarity that such threshold values vary depending on the hardware component in question, such as 4 GB for a disk drive versus 5 MB for computer memory.

If the predicted amount of computational resources needed to be utilized by computing device 101 exceeds or falls behind the current usage of computational resources (provided by monitor engine 201) by a threshold value, then computational resource upgrader/downgrader 205 communicates with vendor system 102 regarding approval for a hardware upgrade/downgrade to match the recommended increase/decrease, respectively, in utilization of the computational resources (e.g., increase of 8 GB of hard disk drive utilization). Such a recommended increase/decrease corresponds to the difference between the predicted amount of computational resources needed to be utilized by computing device 101 and the current usage of computational resources by computing device 101. In one embodiment, such communication occurs electronically, such as via email. In one embodiment, such approval is based on the contractual details between the vendor and the user as conveyed in smart contract 105. In response to receiving approval of the recommended hardware upgrade/downgrade, computational resource upgrader/downgrader 205 presents an option to computing device 101 (user of computing device 101) to upgrade or downgrade the computational resources (e.g., increase of 8 GB of hard disc drive utilization). Furthermore, such a recommended option may also include the increase or reduction in cost for utilizing the additional or fewer computational resources on computing device 101, respectively, as provided by the vendor as defined in smart contract 105. In one embodiment, such a recommended option is presented to the user of computing device 101 on the display of computing device 101.

In one embodiment, such a recommendation is provided to computing device 101 upon verifying the identity of computing device 101, which may correspond to a hardware hash, such as by obtaining the hash of a file storing smart contract 105 in firmware 104 using a hashing algorithm (e.g., Message Digest 5, Secure Hash Algorithm). Such a hash is then compared with hashes stored in a data structure (e.g., table) associated with identifications of various computing devices 101 (e.g., Internet Protocol (IP) addresses), such as those who are being monitored by machine configuration system 106. Hence, in one embodiment, computational resource upgrader/downgrader 205 verifies the identity of computing device 101 by obtaining the IP address of computing device 101 and obtaining the hash of the file storing smart contract 105 in firmware 104 of computing device 101 and determining if such information matches a hash/IP address combination in the data structure discussed above using natural language processing. Computational resource upgrader/downgrader 205 may utilize various software tools for obtaining the IP address of computing device 101 including, but not limited to, SolarWinds® IP Address Manager, Angry IP Scanner, SoftPerfect® Network Scanner, etc. In one embodiment, such a data structure is populated by an expert. In one embodiment, such a data structure is stored in a storage device (e.g., memory, disk unit) of machine configuration system 106.

If the user of computing device 101 accepts the presented option to upgrade or downgrade the computational resources on computing device 101, then computational resource upgrader/downgrader 205 initiates and records a blockchain transaction to upgrade or downgrade the computational resources of computing device 101 as recommended by computational resource upgrader/downgrader 205 (e.g., blockchain transaction to increase 8 GB of hard disc drive utilization). Such a new blockchain transaction results in adding a new block to the distributed ledger of blockchain network 103. Rules are then updated on smart contract 105 (smart contract 105 in firmware 104 of computing device 101 with the hardware upgrade/downgrade) based on the new block added to the distributed ledger of blockchain network 103.

Upon updating the rules of smart contract 105, the amount of computational resources available to be utilized by the user of computing device 101 is automatically adjusted based on the blockchain transaction. For example, the rules of smart contract 105 may be updated so that the user is now able to use 16 GB of hard disc drive utilization as opposed to 8 GB of hard disc drive utilization.

In this manner, usage of computational resources on computing device 101 is seamlessly adjusted without requiring physically installation or removal of hardware by a technician.

A further description of these and other functions is provided below in connection with the discussion of the method for upgrading or downgrading hardware by seamlessly adjusting the usage of computational resources on the computing device.

Prior to the discussion of the method for upgrading or downgrading hardware by seamlessly adjusting the usage of computational resources on the computing device, a description of the hardware configuration of machine configuration system 106 (FIG. 1) is provided below in connection with FIG. 3.

Figure 3:
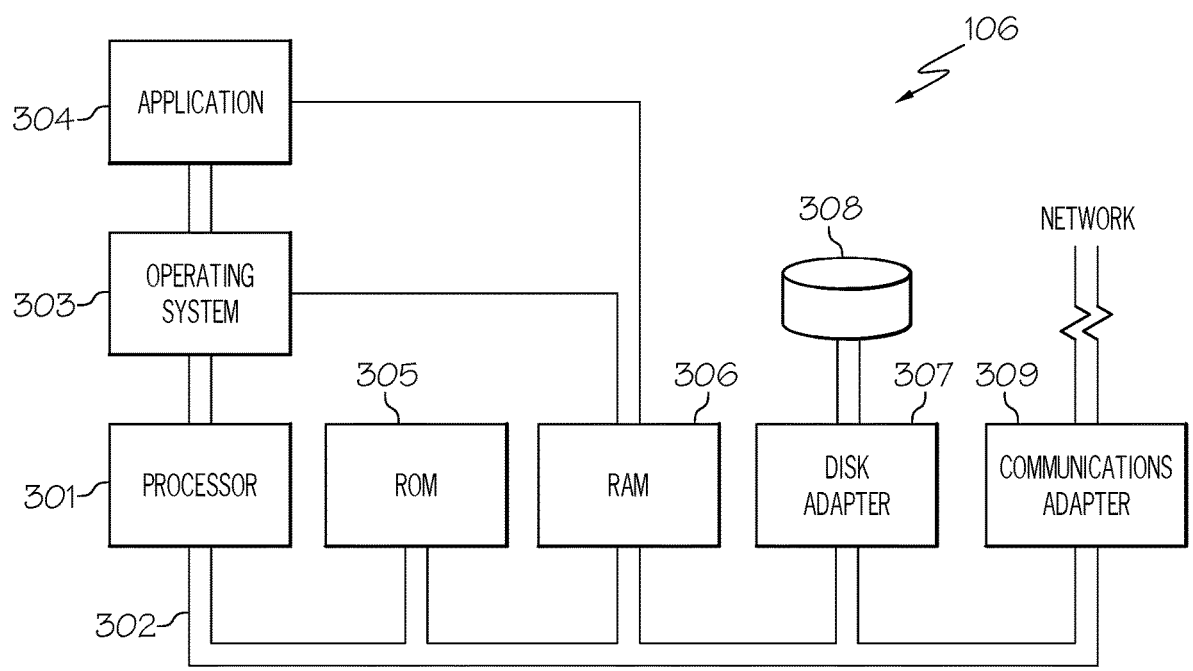
FIG. 3 illustrates an embodiment of the present disclosure of the hardware configuration of the machine configuration system which is representative of a hardware environment for practicing the present disclosure.

Referring now to FIG. 3, FIG. 3 illustrates an embodiment of the present disclosure of the hardware configuration of machine configuration system 106 (FIG. 1) which is representative of a hardware environment for practicing the present disclosure.

Machine configuration system 106 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, monitor engine 201 (FIG. 2), pattern detector 202 (FIG. 2), contextual detector 203 (FIG. 2), machine learning engine 204 (FIG. 2) and computational resource upgrader/downgrader 205 (FIG. 2). Furthermore, application 304 may include, for example, a program for upgrading or downgrading hardware by seamlessly adjusting the usage of computational resources on the computing device as discussed further below in connection with FIGS. 4 and 5A-5B.

Referring again to FIG. 3, read-only memory ("ROM") 305 is connected to system bus 302 and includes a basic input/output system ("BIOS") that controls certain basic functions of computational resource upgrader/downgrader 106. Random access memory ("RAM") 306 and disk adapter 307 are also connected to system bus 302. It should be noted that software components including operating system 303 and application 304 may be loaded into RAM 306, which may be machine configuration system's 106 main memory for execution. Disk adapter 307 may be an integrated drive electronics ("IDE") adapter that communicates with a disk unit 308, e.g., disk drive. It is noted that the program for upgrading or downgrading hardware by seamlessly adjusting the usage of computational resources on the computing device, as discussed further below in connection with FIGS. 4 and 5A-5B, may reside in disk unit 308 or in application 304.

Computational resource upgrader/downgrader 106 may further include a communications adapter 309 connected to bus 302. Communications adapter 309 interconnects bus 302 with an outside network (e.g., blockchain network 103 of FIG. 1) to communicate with other devices, such as computing devices 101, vendor system 102 and web server 107 of FIG. 1.

In one embodiment, application 304 of computational resource upgrader/downgrader 106 includes the software components of monitor engine 201, pattern detector 202, contextual detector 203, machine learning engine 204 and computational resource upgrader/downgrader 205. In one embodiment, such components may be implemented in hardware, where such hardware components would be connected to bus 302. The functions discussed above performed by such components are not generic computer functions. As a result, machine configuration system 106 is a particular machine that is the result of implementing specific, non-generic computer functions.

In one embodiment, the functionality of such software components (e.g., monitor engine 201, pattern detector 202, contextual detector 203, machine learning engine 204 and computational resource upgrader/downgrader 205) of machine configuration system 106, including the functionality for upgrading or downgrading hardware by seamlessly adjusting the usage of computational resources on the computing device, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, hardware upgrades and downgrades in computing devices typically involve the installation or removal of hardware. For example, a hardware upgrade may involve the installation of a hardware enhancement to a standard hardware feature or the installation of optional hardware features. A hardware downgrade, on the other hand, is the opposite of a hardware upgrade. For example, a hardware downgrade may involve the removal of a hardware enhancement or optional hardware features currently being utilized by the user of the computing device. Such hardware upgrades or downgrades involve the installation or removal of computational resources, such as the hard disk drive, processor (e.g., central processing unit), blade, computer memory (random access memory), etc. Currently though in order to upgrade or downgrade hardware on a computing device, an individual needs to physically modify the amount of computational resources currently installed on the computing device, such as by increasing or decreasing the amount of computational resources on the computing devices. Furthermore, prior to such a modification, especially in an enterprise setting, an approval for a hardware upgrade or downgrade would need to be obtained. For a hardware upgrade, a procurement request may need to be made to obtain the additional computational resources to be installed in the computing device followed by having the requested computational resources be delivered at a specific location. The computational resources would then be physically installed on the computing device as discussed above. For a hardware downgrade, after the request for downgrading the computational resources has been approved, a portion of the computational resources on the computing device would then be physically removed as discussed above. Such a process is inefficient, costly and time consuming. In the era of agile philosophy, such a process becomes a constraint for achieving real agility.

Figure 4:
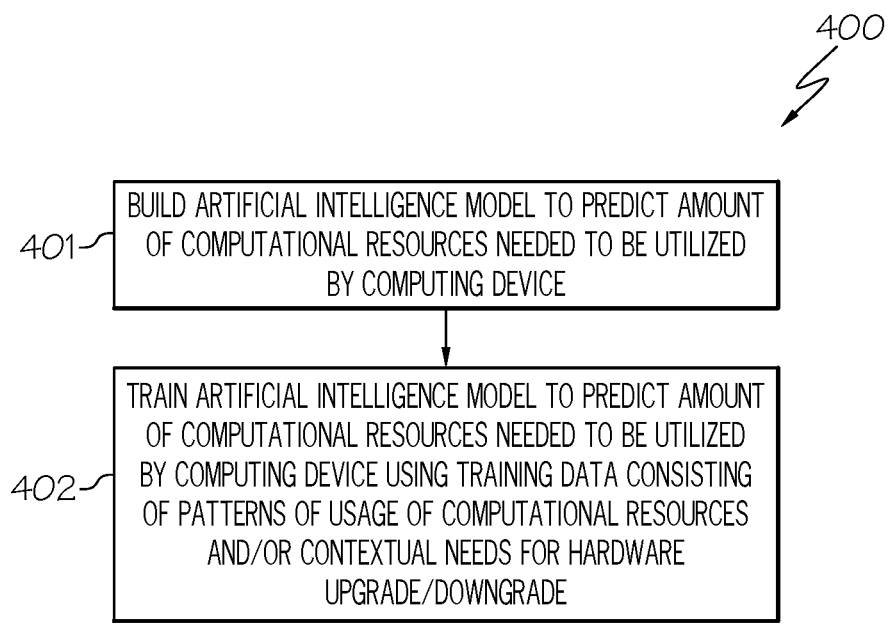
FIG. 4 is a flowchart of a method for creating an artificial intelligence model to predict the amount of computational resources needed to be utilized by a computing device in accordance with an embodiment of the present disclosure.
Figure 5A:
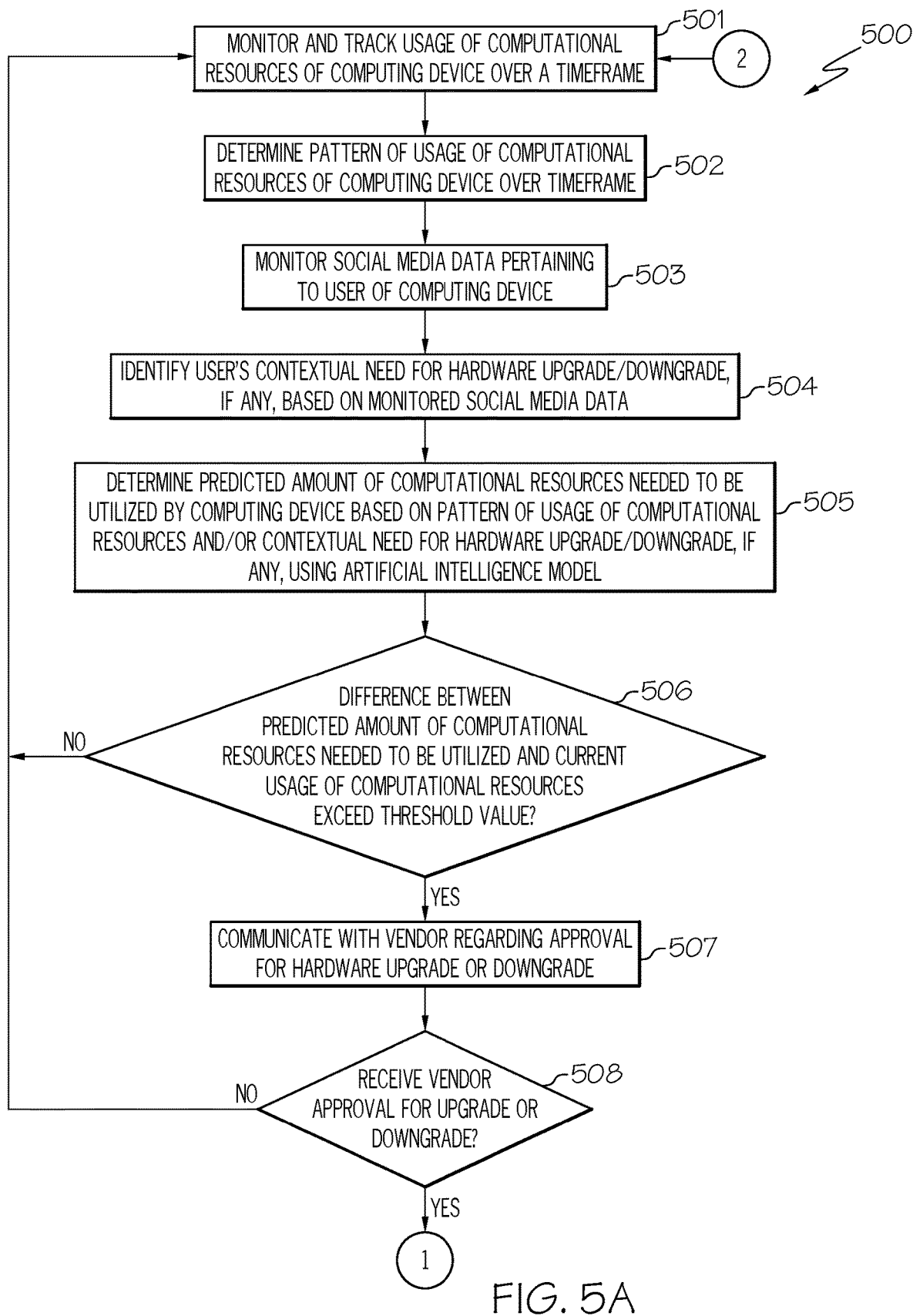
FIGS. 5A-5B are a flowchart of a method for upgrading or downgrading hardware by seamlessly adjusting the usage of the computational resources on the computing device in accordance with an embodiment of the present disclosure.
Figure 5B:
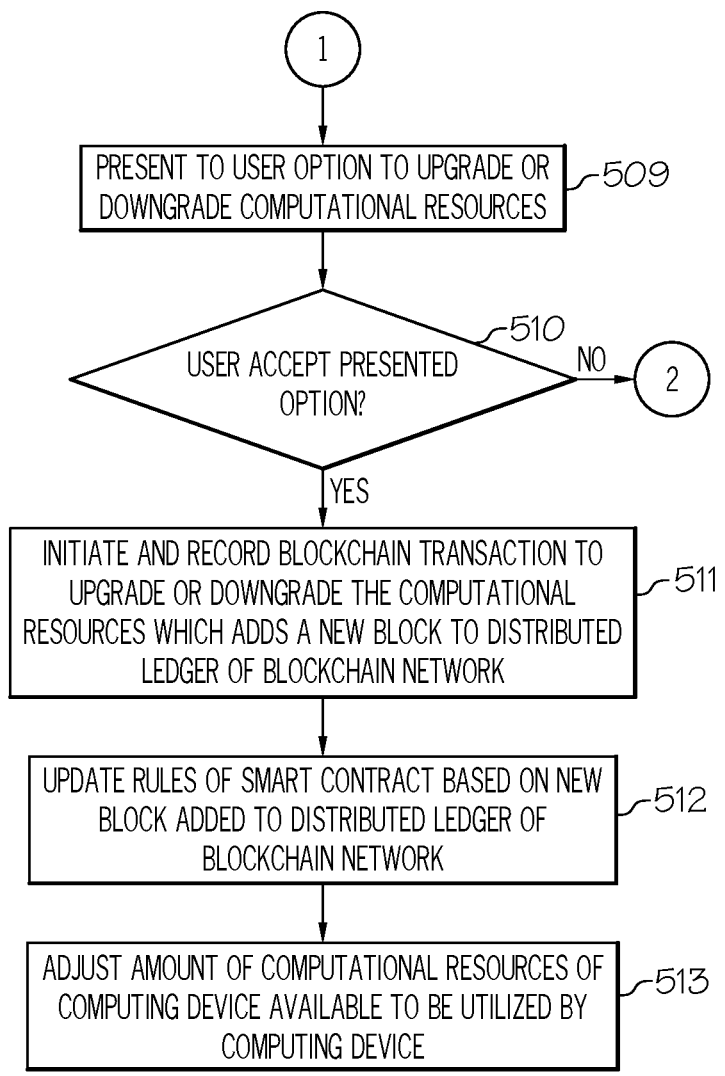

The embodiments of the present disclosure provide a means for achieving real agility for hardware upgrades or downgrades by seamlessly adjusting the usage of the computational resources on the computing device as discussed below in connection with FIGS. 4 and 5A-5B. FIG. 4 is a flowchart of a method for creating an artificial intelligence model to predict the amount of computational resources needed to be utilized by a computing device. FIGS. 5A-5B are a flowchart of a method for upgrading or downgrading hardware by seamlessly adjusting the usage of the computational resources on the computing device.

As stated above, FIG. 4 is a flowchart of a method 400 for creating an artificial intelligence model to predict the amount of computational resources needed to be utilized by a computing device in accordance with an embodiment of the present disclosure.

Referring to FIG. 4, in conjunction with FIGS. 1-3, in step 401, machine learning engine 204 of machine configuration system 106 builds an artificial intelligence model to predict the amount of computational resources needed to be utilized by computing device 101.

In step 402, machine learning engine 204 of machine configuration system 106 trains the artificial intelligence model to predict the amount of computational resources needed to be utilized by computing device 101 using training data consisting of patterns of usage of computational resources and/or contextual needs for hardware upgrades/downgrades.

As discussed above, in one embodiment, machine learning engine 204 is configured to use a machine learning algorithm (e.g., supervised learning) to build an artificial intelligence model based on sample data consisting of patterns of usage of computational resources obtained from pattern detector 202 for various users of computing devices 101 and/or contextual needs for a hardware upgrade/downgrade for various users of computing devices 101 obtained from contextual detector 203 (e.g., increase in the storage space of the hard disk drive based on terms, such as "vacation" and "remote").

Such a data set is referred to herein as the "training data," which is used by the machine learning algorithm to make predictions or decisions as to the appropriate amount of computational resources needed to be utilized by computing device 101, including in the near-term. The algorithm iteratively makes predictions on the training data as to the appropriate amount of computational resources needed to be utilized by computing device 101 until the predictions achieve the desired accuracy. Such a desired accuracy is determined based on the computational resources predicted to be needed by an expert based on the usage patterns of computational resources over a timeframe and/or the contextual needs for a hardware upgrade/downgrade. Examples of such supervised learning algorithms include nearest neighbor, Naïve Bayes, decision trees, linear regression, support vector machines and neural networks.

In one embodiment, the artificial intelligence model (machine learning model) corresponds to a classification model trained to predict the appropriate amount of computational resources needed to be utilized by computing device 101.

Upon training the artificial intelligence model to predict the amount of computational resources needed to be utilized by computing device 101 based on usage patterns of computational resources over a timeframe and/or contextual needs for a hardware upgrade/downgrade, machine configuration system 106 is able to upgrade or downgrade hardware on computing device 101 by seamlessly adjusting the usage of the computational resources on computing device 101 as discussed below in connection with FIGS. 5A-5B.

FIGS. 5A-5B are a flowchart of a method 500 for upgrading or downgrading hardware by seamlessly adjusting the usage of the computational resources on the computing device (e.g., computing device 101) in accordance with an embodiment of the present disclosure.

Referring to FIG. 5A, in conjunction with FIGS. 1-4, in step 501, monitor engine 201 of machine configuration system 106 monitors and tracks usage of the computational resources of computing device 101 over a timeframe.

As stated above, in one embodiment, monitor engine 201 is configured to monitor and track the usage of the computational resources of computing device 101 over a timeframe, which includes monitoring and tracking the current usage of the computational resources of computing device 101.

As previously discussed, computing device 101 is preloaded with hardware, where the usage of such hardware is based on a subscription as defined in a smart contract. Such hardware includes "computational resources," including, but not limited to, the hard disk drive, processor cores, blades, computer memory (random access memory), etc. That is, such computational resources correspond to hardware computing resources. There may be times when the subscription needs to be updated to reflect a hardware upgrade or downgrade to increase or decrease the computational resources available to be used by the user of computing device 101. Such an adjustment may occur based on the predicted amount of computational resources needed to be utilized by computing device 101 as discussed further below.

Examples of software tools utilized by monitor engine 201 to monitor and track usage of the computational resources of computing device 101 over a timeframe, include, but not limited to, SolarWinds® Server and Application Monitor, SolarWinds® Storage Resource Monitor, Paessler® PRTG®, SolarWinds® Monitor Tool, PRTG® Network Monitor, ManageEngine® OpManager, SolarWinds® Memory Monitor Tool, WhatsUp® Gold, etc.

In step 502, pattern detector 202 of machine configuration system 106 determines the pattern of usage of the computational resources of computing device 101 over the timeframe (timeframe of step 501) based on the monitored and tracked usage of the computational resources of computing device 101 in step 501.

As discussed above, in one embodiment, a "pattern of usage" of the computational resources, as used herein, refers to the variance in usage of the computational resources (e.g., core of a multicore processor, computer memory) over a timeframe (e.g., last 60 minutes).

Examples of software tools utilized by pattern detector 202 to determine the pattern of usage of the computational resources based on the monitored and tracked usage of the computational resources, include, but not limited to, SolarWinds® Server and Application Monitor, SolarWinds® Storage Resource Monitor, Paessler® PRTG®, SolarWinds® Monitor Tool, PRTG® Network Monitor, ManageEngine® OpManager, SolarWinds® Memory Monitor Tool, WhatsUp® Gold, etc.

In step 503, monitor engine 201 of machine configuration system 106 monitors social media data pertaining to the user of computing device 101.

For example, monitor engine 201 may search and examine social media data posted by the user of computing device 101 on the Internet. Such postings may involve publicly available postings made by the user of computing device 101 on social media platforms (e.g., Twitter®, Facebook®) hosted by web server 107. For example, such postings may be made by the user of computing device 101 on the user's publicly accessible social media profile page.

In one embodiment, the particular user's social media accounts are identified based on the username of the user of computing device 101, which may be provided to machine configuration system 106 by the user upon initiation of the utilization of the computational resources on computing device 101 via smart contract 105. Such information may be inputted to machine configuration system 106 via various input means of computing device 101, such as keyboard, mouse, etc. Upon receipt of the username, the user's username may be utilized by an application (e.g., WhatsMyName, NameCheck, Sherlock) to identify social media accounts associated with the user's username. In an alternative embodiment, the user of computing device 101 provides a listing of the social media accounts to machine configuration system 106 upon initiation of the utilization of the computational resources on computing device 101 via smart contract 105, such as via various input means of computing device 101, such as keyboard, mouse, etc.

Examples of software tools utilized by monitor engine 201 to monitor social media data, such as social media posts, include, but not limited to, Keyhole, Hootsuite®, Twitter® Counter, Digimind®, TweetReach, Sprout Social®, Klout®, Buzzlogix®, Zoho® Social, Agorapulse®, Brand24®, Mention®, Trackur, etc.

In step 504, contextual detector 203 of machine configuration system 106 identifies the user's contextual need for a hardware upgrade/downgrade, if any, based on the monitored social media data (step 503).

As discussed above, in one embodiment, contextual detector 203 is configured to determine if there is a contextual need for a hardware upgrade/downgrade based on identifying keywords in the monitored social media data that are stored in a data structure (e.g., table). As discussed above, a contextual need for a hardware upgrade/downgrade refers to the circumstances, such as leaned from social media data, that would indicate a change (e.g., hardware upgrade/downgrade) in the amount of computational resources that should be available to be used by the user of computing device 101. Such circumstances may be identified based on keywords stored in the data structure discussed above. For example, keywords, such as "vacation" or "travel" along with the term "remote" may be associated with a contextual need for a hardware upgrade, such as an increase in the storage space of the hard disk drive of computing device 101 to store movies, videos, etc. for the children to be entertained. In one embodiment, contextual detector 203 performs a look-up in such a data structure using natural language processing for terms that match the text in the examined social media posts, and therefore, identify a contextual need for a hardware upgrade/downgrade as identified in the data structure. By matching such terms, contextual detector 203 is able to identify a contextual need for a hardware upgrade/downgrade in the data structure. In one embodiment, such keywords and associated contextual needs for a hardware upgrade/downgrade (e.g., increase in the storage space of the hard disk drive based on terms, such as "vacation" and "remote") are populated in the data structure discussed above by an expert. In one embodiment, such a data structure is stored in a storage device (e.g., memory 305, disk unit 308) of machine configuration system 106.

Furthermore, contextual detector 203 determines the duration of time for such a change (e.g., hardware upgrade/downgrade) based on the terms used in the examined social media posts. For instance, the user of computing device 101 may indicate returning from vacation within one week from the day the user leaves for vacation in a social media post. As a result, the contextual need for a hardware upgrade may only be for a week while the user is on vacation. In one embodiment, such circumstances may be identified based on keywords stored in the data structure discussed above. For example, keywords, such as "returning home" or "ending vacation" may be associated with a contextual need for a hardware downgrade, such as a decrease in the storage space of the hard disk drive of computing device 101 or a return to a prior amount of storage space of the hard disk drive of computing device 101 on the date that the user returns home from vacation since the original need for having an additional amount of storage space (e.g., to store movies, videos, etc. for the children to be entertained) is no longer applicable. As discussed above, in one embodiment, contextual detector 203 performs a look-up in such a data structure using natural language processing for terms that match the text in the examined social media posts, and therefore, identify a contextual need for a hardware upgrade/downgrade as identified in the data structure. By matching such terms, contextual detector 203 is able to identify a contextual need for a hardware upgrade/downgrade in the data structure. In one embodiment, such keywords and associated contextual needs for a hardware upgrade/downgrade (e.g., return to a prior amount of storage space in the hard disk drive based on terms, such as "returning home") are populated in the data structure discussed above by an expert. In one embodiment, such a data structure is stored in a storage device (e.g., memory 305, disk unit 308) of machine configuration system 106.

In step 505, machine learning engine 204 of machine configuration system 106 determines the predicted amount of computational resources needed to be utilized by computing device 101 based on the pattern of usage of computational resources (obtained from pattern detector 202 in step 502) and/or the contextual need for a hardware upgrade/downgrade, if any, (obtained from contextual detector 203 in step 504) using the artificial intelligence model (previously built and trained as discussed above in connection with FIG. 4). For example, the artificial intelligence model may determine that the predicted amount of computational resources needed to be utilized by computing device 101 corresponds to 16 GB of disk space in the hard disk drive.

In step 506, computational resource upgrader/downgrader 205 of machine configuration system 106 determines whether the difference between the predicted amount of computational resources needed to be utilized by computing device 101 (obtained from machine learning engine 204 in step 505) and the current usage of computational resources of computing device 101 (obtained from monitor engine 201 in step 501) exceeds a threshold value, which may be user-selected.

For example, resource upgrader/downgrader 205 of machine configuration system 106 may determine whether the predicted amount of computational resources needed to be utilized by computing device 101 (e.g., 16 GB of disk space of the hard disk drive) exceeds or falls behind the current usage of computational resources (e.g., 8 GB of disk space of the hard disk drive), as provided by monitor engine 201, by a threshold value (e.g., 4 GB for hard disk drive), which may be user-selected. It is noted for clarity that such threshold values vary depending on the hardware component in question, such as 4 GB for a disk drive versus 5 MB for computer memory.

If the difference between the predicted amount of computational resources needed to be utilized by computing device 101 and the current usage of computational resources (provided by monitor engine 201) of computing device 101 does not exceed the threshold value, then monitor engine 201 continues to monitor and track the usage of the computational resources of computing device 101 over a timeframe in step 501.

If, however, the difference between the predicted amount of computational resources needed to be utilized by computing device 101 and the current usage of computational resources of computing device 101 exceeds the threshold value, then, in step 507, computational resource upgrader/downgrader 205 of machine configuration system 106 communicates with vendor system 102 regarding approval for a hardware upgrade/downgrade to match the recommended increase/decrease, respectively, in utilization of the computational resources (e.g., increase of 8 GB of hard disk drive utilization). Such a recommended increase/decrease corresponds to the difference between the predicted amount of computational resources needed to be utilized by computing device 101 and the current usage of computational resources by computing device 101. In one embodiment, such communication occurs electronically, such as via email.

As discussed above, vendor system 102 corresponds to a "blockchain vendor," which refers to an enterprise that provides services, such as approval or denial of upgrading or downgrading the computational resources in computing device 101. Such approval or denial may be based on the rules for the usage of the computational resources as recited in smart contract 105. That is, such approval may be based on the contractual details between the vendor and the user (user of computing device 101) as conveyed in smart contract 105.

In step 508, computational resource upgrader/downgrader 205 of machine configuration system 106 determines whether the vendor approves the recommended hardware upgrade/downgrade. For example, in one embodiment, vendor system 102 may issue a communication (e.g., electronic message) indicating an approval or disapproval of the recommended hardware upgrade/downgrade.

If the vendor denies approval for the recommended hardware upgrade/downgrade, then monitor engine 201 continues to monitor and track the usage of the computational resources of computing device 101 over a timeframe in step 501.

Referring now to FIG. 5B, in conjunction with FIGS. 1-4, if, however, the vendor provides approval for the recommended hardware upgrade/downgrade, then, in step 509, computational resource upgrader/downgrader 205 of machine configuration system 106 presents an option to computing device 101 (user of computing device 101) to upgrade or downgrade the computational resources (e.g., increase of 8 GB of hard disc drive utilization) per the recommended increase/decrease in utilization (e.g., increase of 8 GB of hard disc drive utilization). Furthermore, such a recommended option may also include the increase or reduction in cost for utilizing the additional or fewer computational resources on computing device 101, respectively, as provided by the vendor as defined in smart contract 105. In one embodiment, such a recommended option is presented to the user of computing device 101 on the display of computing device 101.

As stated above, in one embodiment, such a recommendation is provided to computing device 101 upon verifying the identity of computing device 101, which may correspond to a hardware hash, such as by obtaining the hash of a file storing smart contract 105 in firmware 104 using a hashing algorithm (e.g., Message Digest 5, Secure Hash Algorithm). Such a hash is then compared with hashes stored in a data structure (e.g., table) associated with identifications of various computing devices 101 (e.g., Internet Protocol (IP) addresses), such as those who are being monitored by machine configuration system 106. Hence, in one embodiment, computational resource upgrader/downgrader 205 verifies the identity of computing device 101 by obtaining the IP address of computing device 101 and obtaining the hash of the file storing smart contract 105 in firmware 104 of computing device 101 and determining if such information matches a hash/IP address combination in the data structure discussed above using natural language processing. Computational resource upgrader/downgrader 205 may utilize various software tools for obtaining the IP address of computing device 101 including, but not limited to, SolarWinds® IP Address Manager, Angry IP Scanner, SoftPerfect® Network Scanner, etc. In one embodiment, such a data structure is populated by an expert. In one embodiment, such a data structure is stored in a storage device (e.g., memory 305, disk unit 308) of machine configuration system 106.

In step 510, computational resource upgrader/downgrader 205 of machine configuration system 106 determines whether the user accepted the presented option. In one embodiment, the user of computing device 101 accepts or rejects the recommended option based on various input means of computing device 101, such as via keyboard, mouse, etc.

If the user of computing device 101 did not accept the presented option, then monitor engine 201 continues to monitor and track the usage of the computational resources of computing device 101 over a timeframe in step 501.

If, however, the user of computing device 101 accepts the presented option to upgrade or downgrade the computational resources on computing device 101, then, in step 511, computational resource upgrader/downgrader 205 of machine configuration system 106 initiates and records a blockchain transaction to upgrade or downgrade the computational resources of computing device 101 as recommended by computational resource upgrader/downgrader 205 (e.g., blockchain transaction to increase 8 GB of hard disc drive utilization). Such a new blockchain transaction results in adding a new block to the distributed ledger of blockchain network 103.

In step 512, computational resource upgrader/downgrader 205 of machine configuration system 106 updates the rules on smart contract 105 (smart contract 105 in firmware 104 of computing device 101 with the hardware upgrade/downgrade) based on the blockchain transaction. That is, computational resource upgrader/downgrader 205 updates the rules on smart contract 105 based on the new block added to the distributed ledger of blockchain network 103.

Upon updating the rules of smart contract 105, in step 513, the amount of computational resources available to be utilized by the user of computing device 101 is automatically adjusted based on the blockchain transaction. For example, the rules of smart contract 105 may be updated so that the user is now able to use 16 GB of hard disc drive utilization as opposed to 8 GB of hard disc drive utilization.

In this manner, the hardware usage of the computational resources on computing device 101 is seamlessly adjusted without requiring physically installation or removal of hardware by a technician.

Furthermore, the principles of the present disclosure improve the technology or technical field involving hardware upgrades and downgrades.

As discussed above, hardware upgrades and downgrades in computing devices typically involve the installation or removal of hardware. For example, a hardware upgrade may involve the installation of a hardware enhancement to a standard hardware feature or the installation of optional hardware features. A hardware downgrade, on the other hand, is the opposite of a hardware upgrade. For example, a hardware downgrade may involve the removal of a hardware enhancement or optional hardware features currently being utilized by the user of the computing device. Such hardware upgrades or downgrades involve the installation or removal of computational resources, such as the hard disk drive, processor (e.g., central processing unit), blade, computer memory (random access memory), etc. Currently though in order to upgrade or downgrade hardware on a computing device, an individual needs to physically modify the amount of computational resources currently installed on the computing device, such as by increasing or decreasing the amount of computational resources on the computing devices. Furthermore, prior to such a modification, especially in an enterprise setting, an approval for a hardware upgrade or downgrade would need to be obtained. For a hardware upgrade, a procurement request may need to be made to obtain the additional computational resources to be installed in the computing device followed by having the requested computational resources be delivered at a specific location. The computational resources would then be physically installed on the computing device as discussed above. For a hardware downgrade, after the request for downgrading the computational resources has been approved, a portion of the computational resources on the computing device would then be physically removed as discussed above. Such a process is inefficient, costly and time consuming. In the era of agile philosophy, such a process becomes a constraint for achieving real agility.

Embodiments of the present disclosure improve such technology by determining a pattern of usage of the computational resources of the computing device over a timeframe. Such a computing device may be preloaded with the computational resources, where such computational resources correspond to hardware computing resources (e.g., hard disk drive, processor core, blade, computer memory, etc.). Furthermore, only a portion of the computational resources may be available to be utilized by the user of the computing device based on a subscription as defined in a smart contract, which may be stored in the firmware of the computing device. After determining the pattern of usage of the computational resources of the computing device over the timeframe, such a pattern of usage may be used by an artificial intelligence model to determine a predicted amount of computational resources needed to be utilized by the computing device. Furthermore, in one embodiment, the artificial intelligence model may alternatively, or in addition, utilize any identified contextual needs for upgrading or downgrading the computational resources of the computing device to determine the predicted amount of computational resources needed to be utilized by the computing device. "Contextual need" for a hardware upgrade/downgrade, as used herein, refers to the circumstances, such as leaned from social media data, that would indicate a change (e.g., hardware upgrade/downgrade) in the amount of computational resources that should be available to be used by the user of the computing device. "Upgrading," as used herein, refers to a hardware upgrade which may involve the access of additional hardware resources, such as computational resources (e.g., increasing the storage space available to be used on the hard disk drive by the user). "Downgrading," as used herein, refers to the opposite of upgrading, namely, a hardware downgrade which may involve the denial of access of hardware resources, such as computational resources (e.g., decreasing the storage space available to be used on the hard disk drive by the user). Based on the predicted amount of computational resources needed to be utilized by the computing device, a blockchain transaction is initiated and recorded to upgrade or downgrade the computational resources of the computing device in response to the difference between the predicted amount of computational resources needed to be utilized by the computing device and the current usage of the computational resources of the computing device exceeding a threshold value and in response to receiving approval for such a hardware upgrade/downgrade by the vendor and the user. Such a new blockchain transaction results in adding a new block to the distributed ledger of the blockchain network. The rules on the smart contract are then updated based on the new block added to the distributed ledger of the blockchain network. Upon updating the rules of the smart contract, the amount of computational resources available to be utilized by the user of the computing device is automatically adjusted based on the blockchain transaction. In this manner, usage of the computational resources on the computing device is seamlessly adjusted without requiring physically installation or removal of hardware by a technician. Furthermore, in this manner, there is an improvement in the technical field involving hardware upgrades and downgrades.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for seamlessly adjusting utilization of computational resources of a computing device, the method comprising:

training an artificial intelligence model to predict an amount of computational resources needed to be utilized by said computing device using training data comprising one or more of the following selected from the group consisting of: patterns of usage of computational resources and contextual needs for upgrading or downgrading computational resources;

determining a pattern of usage of said computational resources of said computing device over a timeframe, wherein said computing device is preloaded with said computational resources, wherein said computational resources correspond to hardware computing resources, wherein a portion of said computational resources is available to be utilized by a user of said computing device based on a subscription as defined in a smart contract;

determining, by said artificial intelligence model, a predicted amount of computational resources needed to be utilized by said computing device using said determined pattern of usage of said computational resources of said computing device over said timeframe;

initiating and recording a blockchain transaction to upgrade or downgrade said computational resources of said computing device, performed by executing a computational resource upgrader/downgrader, based on said predicted amount of computational resources needed to be utilized by said computing device; and updating rules of said smart contract based on said blockchain transaction thereby adjusting an amount of said computational resources of said computing device available to be utilized by said user of said computing device.

2. The method as recited in claim 1 further comprising:
presenting an option to upgrade or downgrade said computational resources of said computing device in response to a difference between said predicted amount of computational resources needed to be utilized by said computing device and a current usage of said computational resources of said computing device exceeding a threshold value; and initiating and recording said blockchain transaction to upgrade or downgrade said computational resources of said computing device in response to said user accepting said option to upgrade or downgrade said computational resources of said computing device.

3. The method as recited in claim 1 further comprising;
communicating with a vendor system regarding approval for upgrading or downgrading said computational resources of said computing device.

4. The method as recited in claim 1 further comprising:
monitoring and tracking usage of said computational resources of said computing device over said timeframe; and determining said pattern of usage of said computational resources of said computing device over said timeframe based on said monitoring and tracking.

5. The method as recited in claim 1 further comprising:
monitoring social media data pertaining to said user of said computing device; and identifying a contextual need for upgrading or downgrading said computational resources of said computing device based on said monitored social media data.

6. The method as recited in claim 5 further comprising:
determining, by said artificial intelligence model, said predicted amount of computational resources needed to be utilized by said computing devices using said determined pattern of usage of said computational resources of said computing device over said timeframe and said identified contextual need for upgrading or downgrading said computational resources of said computing device.

7. The method as recited in claim 3,
wherein said approval for upgrading or downgrading said computational resources of said computing device is based on rules for usage of said computational resources of said computing device as recited in said smart contract.

8. The method as recited in claim 1, wherein said blockchain transaction adds a new block to a distributed ledger of a blockchain network, wherein the method further comprises:

updating rules of said smart contract based on said new block added to said distributed ledger of said blockchain network.

9. A computer program product for seamlessly adjusting utilization of computational resources of a computing device, the computer program product comprising one or more computer readable storage mediums having program code embodied therewith, the program code comprising programming instructions for:

training an artificial intelligence model to predict an amount of computational resources needed to be utilized by said computing device using training data comprising one or more of the following selected from the group consisting of: patterns of usage of computational resources and contextual needs for upgrading or downgrading computational resources;

determining a pattern of usage of said computational resources of said computing device over a timeframe, wherein said computing device is preloaded with said computational resources, wherein said computational resources correspond to hardware computing resources, wherein a portion of said computational resources is available to be utilized by a user of said computing device based on a subscription as defined in a smart contract;

determining, by said artificial intelligence model, a predicted amount of computational resources needed to be utilized by said computing device using said determined pattern of usage of said computational resources of said computing device over said timeframe;

initiating and recording a blockchain transaction to upgrade or downgrade said computational resources of said computing device, performed by executing a computational resource upgrader/downgrader, based on said predicted amount of computational resources needed to be utilized by said computing device; and updating rules of said smart contract based on said blockchain transaction thereby adjusting an amount of said computational resources of said computing device available to be utilized by said user of said computing device.

10. The computer program product as recited in claim 9, wherein the program code further comprises the programming instructions for:

presenting an option to upgrade or downgrade said computational resources of said computing device in response to a difference between said predicted amount of computational resources needed to be utilized by said computing device and a current usage of said computational resources of said computing device exceeding a threshold value; and initiating and recording said blockchain transaction to upgrade or downgrade said computational resources of said computing device in response to said user accepting said option to upgrade or downgrade said computational resources of said computing device.

11. The computer program product as recited in claim 9, wherein the program code further comprises the programming instructions for:

communicating with a vendor system regarding approval for upgrading or downgrading said computational resources of said computing device.

12. The computer program product as recited in claim 9, wherein the program code further comprises the programming instructions for:

monitoring and tracking usage of said computational resources of said computing device over said timeframe; and determining said pattern of usage of said computational resources of said computing device over said timeframe based on said monitoring and tracking.

13. The computer program product as recited in claim 9, wherein the program code further comprises the programming instructions for:

monitoring social media data pertaining to said user of said computing device; and identifying a contextual need for upgrading or downgrading said computational resources of said computing device based on said monitored social media data.

14. The computer program product as recited in claim 13, wherein the program code further comprises the programming instructions for:

determining, by said artificial intelligence model, said predicted amount of computational resources needed to be utilized by said computing devices using said determined pattern of usage of said computational resources of said computing device over said timeframe and said identified contextual need for upgrading or downgrading said computational resources of said computing device.

15. The computer program product as recited in claim 11, wherein said approval for upgrading or downgrading said computational resources of said computing device is based on rules for usage of said computational resources of said computing device as recited in said smart contract.

16. The computer program product as recited in claim 9, wherein said blockchain transaction adds a new block to a distributed ledger of a blockchain network, wherein the program code further comprises the programming instructions for:

updating rules of said smart contract based on said new block added to said distributed ledger of said blockchain network.

17. A system, comprising:

a memory for storing a computer program for seamlessly adjusting utilization of computational resources of a computing device; and a processor connected to said memory, wherein said processor is configured to execute program instructions of the computer program comprising:

training an artificial intelligence model to predict an amount of computational resources needed to be utilized by said computing device using training data comprising one or more of the following selected from the group consisting of: patterns of usage of computational resources and contextual needs for upgrading or downgrading computational resources;

determining a pattern of usage of said computational resources of said computing device over a timeframe, wherein said computing device is preloaded with said computational resources, wherein said computational resources correspond to hardware computing resources, wherein a portion of said computational resources is available to be utilized by a user of said computing device based on a subscription as defined in a smart contract;

determining, by said artificial intelligence model, a predicted amount of computational resources needed to be utilized by said computing device using said determined pattern of usage of said computational resources of said computing device over said timeframe;

initiating and recording a blockchain transaction to upgrade or downgrade said computational resources of said computing device, performed by executing a computational resource upgrader/downgrader, based on said predicted amount of computational resources needed to be utilized by said computing device; and updating rules of said smart contract based on said blockchain transaction thereby adjusting an amount of said computational resources of said computing device available to be utilized by said user of said computing device.

18. The system as recited in claim 17, wherein the program instructions of the computer program further comprise:

presenting an option to upgrade or downgrade said computational resources of said computing device in response to a difference between said predicted amount of computational resources needed to be utilized by said computing device and a current usage of said computational resources of said computing device exceeding a threshold value; and initiating and recording said blockchain transaction to upgrade or downgrade said computational resources of said computing device in response to said user accepting said option to upgrade or downgrade said computational resources of said computing device.

19. The system as recited in claim 17, wherein the program instructions of the computer program further comprise:

communicating with a vendor system regarding approval for upgrading or downgrading said computational resources of said computing device.

20. The system as recited in claim 17, wherein the program instructions of the computer program further comprise:

monitoring and tracking usage of said computational resources of said computing device over said timeframe; and determining said pattern of usage of said computational resources of said computing device over said timeframe based on said monitoring and tracking.

* * * * *